United States Patent [19]

Yoshio

[11] Patent Number: 4,953,035

[45] Date of Patent: Aug. 28, 1990

[54] METHOD OF RECORDING AND REPRODUCING PICTURE INFORMATION, RECORDING MEDIUM, AND RECORDING MEDIUM PLAYING APPARATUS

[75] Inventor: Junichi Yoshio, Tokorozawa, Japan

[73] Assignee: Pioneer Electronics Corporation, Tokyo, Japan

[21] Appl. No.: 248,387

[22] Filed: Sep. 23, 1988

[30] Foreign Application Priority Data

Mar. 22, 1988 [JP] Japan .................................. 63-67598

[51] Int. Cl.⁵ .............................................. H04N 5/76
[52] U.S. Cl. .................................................. 358/335
[58] Field of Search ................... 369/30, 32; 360/72.2, 360/14; 358/341, 342, 335; 340/747, 809

[56] References Cited

U.S. PATENT DOCUMENTS

| | | | |
|---|---|---|---|
| 4,523,304 | 6/1985 | Satoh et al. | 369/32 |
| 4,761,692 | 8/1988 | Yoshida et al. | 358/335 |
| 4,774,596 | 9/1988 | Hashimoto | 358/335 |
| 4,803,477 | 2/1989 | Miyatake et al. | 340/747 |

FOREIGN PATENT DOCUMENTS 1254295  11/1971  United Kingdom ............... 360/14.1

Primary Examiner—Robert L. Richardson
Attorney, Agent, or Firm—Wegner & Bretschneider

[57] ABSTRACT

Method of recording and reproducing picture information and a recording medium on which the picture information is recorded by the method, and an apparatus for playing such a recording medium. In addition to a coded information signal, graphic codes including picture information being inserted as a subcode of the coded information signal and identification information indicating areas of the recording medium in which predetermined sections of the subcode are recorded are recorded on the recording medium. At the time of playback of the recording medium, the areas are searched in response to a command by using the identification information and a picture signal corresponding to the graphic codes obtained by reading information recorded in that areas of the recording medium.

5 Claims, 17 Drawing Sheets

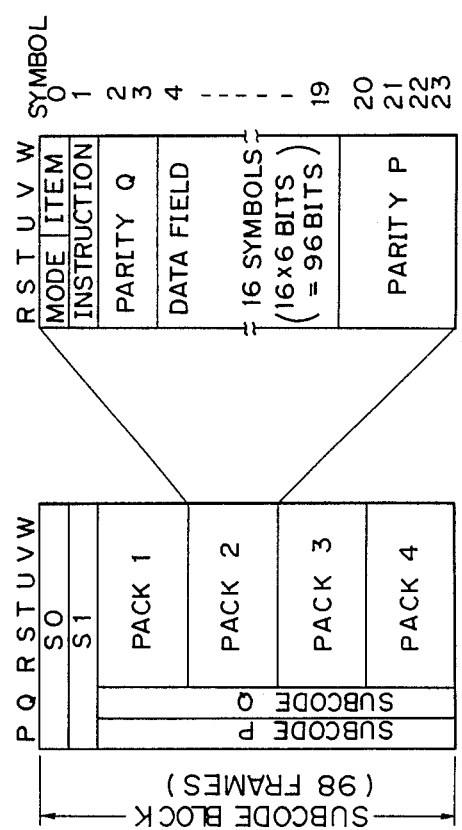
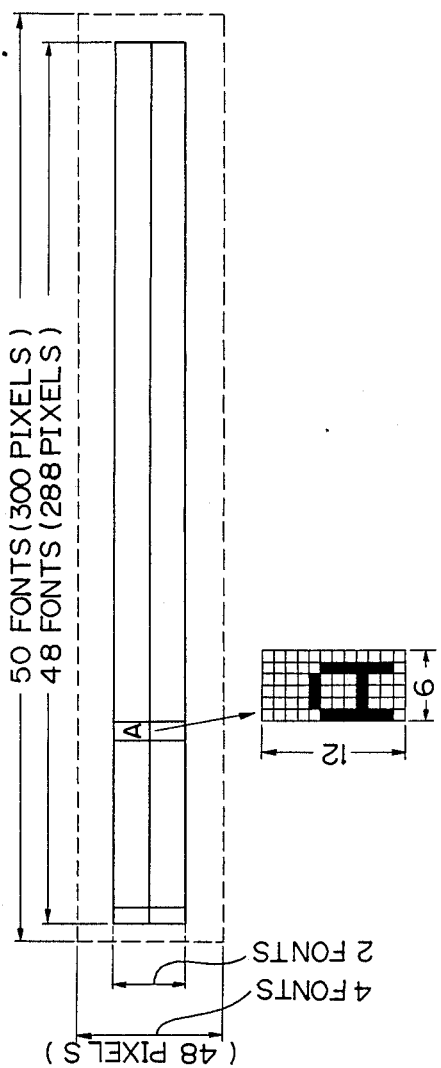
Fig. 1
Fig. 2

Fig. 4
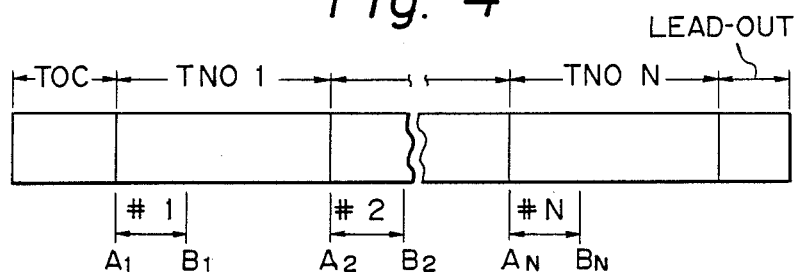
Fig. 5
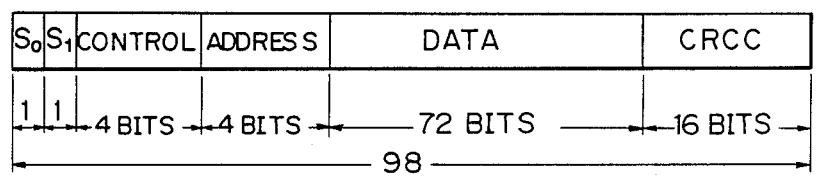
Fig. 6
| MUSIC NUMBER | LABEL | Ai | | | | Bi | | |
|---|---|---|---|---|---|---|---|---|
| | | MIN. | SEC. | FRAME | | MIN. | SEC. | FRAME |
| DATA NUMBER 1 | 1 | $A_1$ | | | 0 | $B_1$ | | |
| 2 | 1 | $A_2$ | | | 0 | $B_2$ | | |
| ⋮ | ⋮ | ⋮ | | | ⋮ | ⋮ | | |
| N | 1 | $A_N$ | | | 0 | $B_N$ | | |

Fig. 7

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig. 8

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | | | | | | |
| 19 | 0 | 0 | 0 | 0 | 0 | 0 |
| 20 | PARITY P | | | | | |
| ⋮ | | | | | | |
| 23 | | | | | | |

Fig. 9

| TCB | | MODE | SUBCODE PICTURE | MOTION PICTURE |
|---|---|---|---|---|
| 0 | 0 | TRANSPARENT MODE | 0 % | 100 % |
| 1 | 0 | MIXING MODE | M % | (100-M) % |
| 1 | 1 | NON-TRANSPARENT MODE | 100 % | 0 % |

Fig. 10

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | PARITY Q ||||||
| 3 | ||||||
| 4 | COLOR 0 ||||||
| 5 | ||||||
| 6 | ⋮ ||||||
| 17 | ||||||
| 18 | COLOR 7 ||||||
| 19 | ||||||
| 20 | PARITY P ||||||
| ⋮ | ||||||
| 23 | ||||||

Fig. 11

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | PARITY Q ||||||
| 3 | ||||||
| 4 | CHANNEL || COLOR 0 ||||
| 5 | CHANNEL || COLOR 1 ||||
| 6 | 0 || ROW ||||
| 7 | COLUMN ||||||
| 8 | FONT ||||||
| ⋮ | ||||||
| 19 | ||||||
| 20 | PARITY P ||||||
| ⋮ | ||||||
| 23 | ||||||

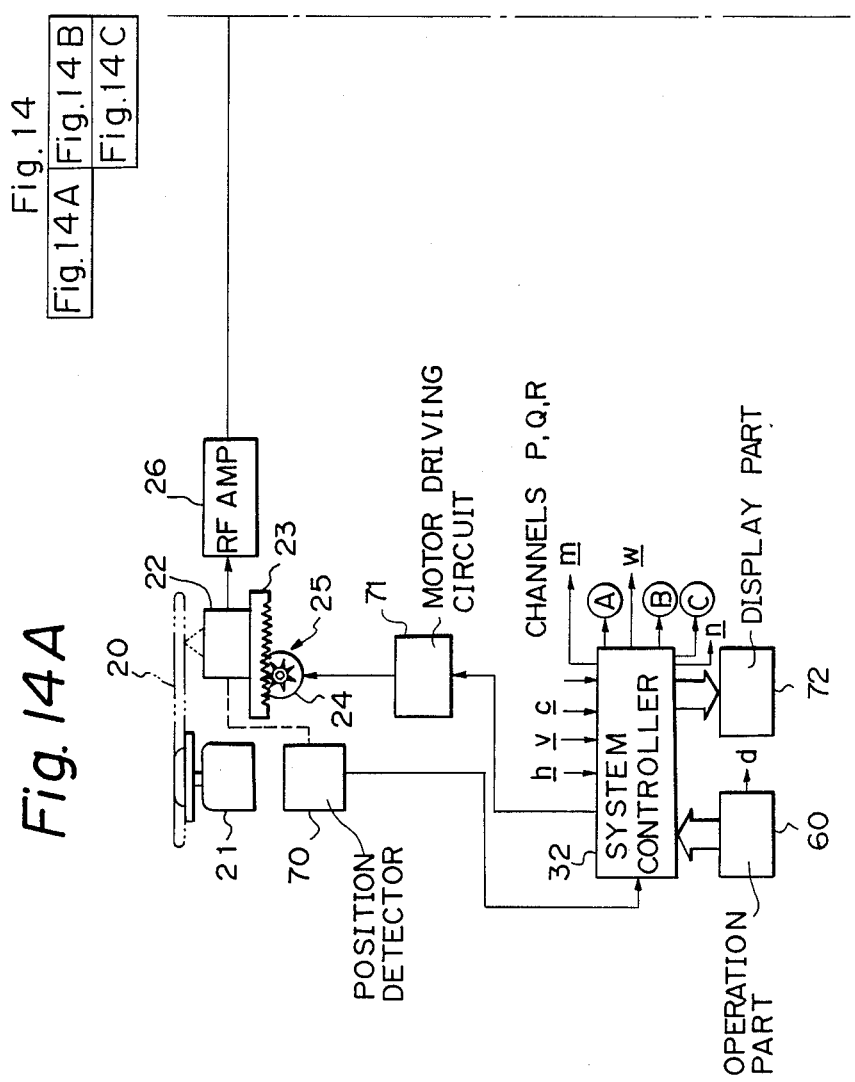

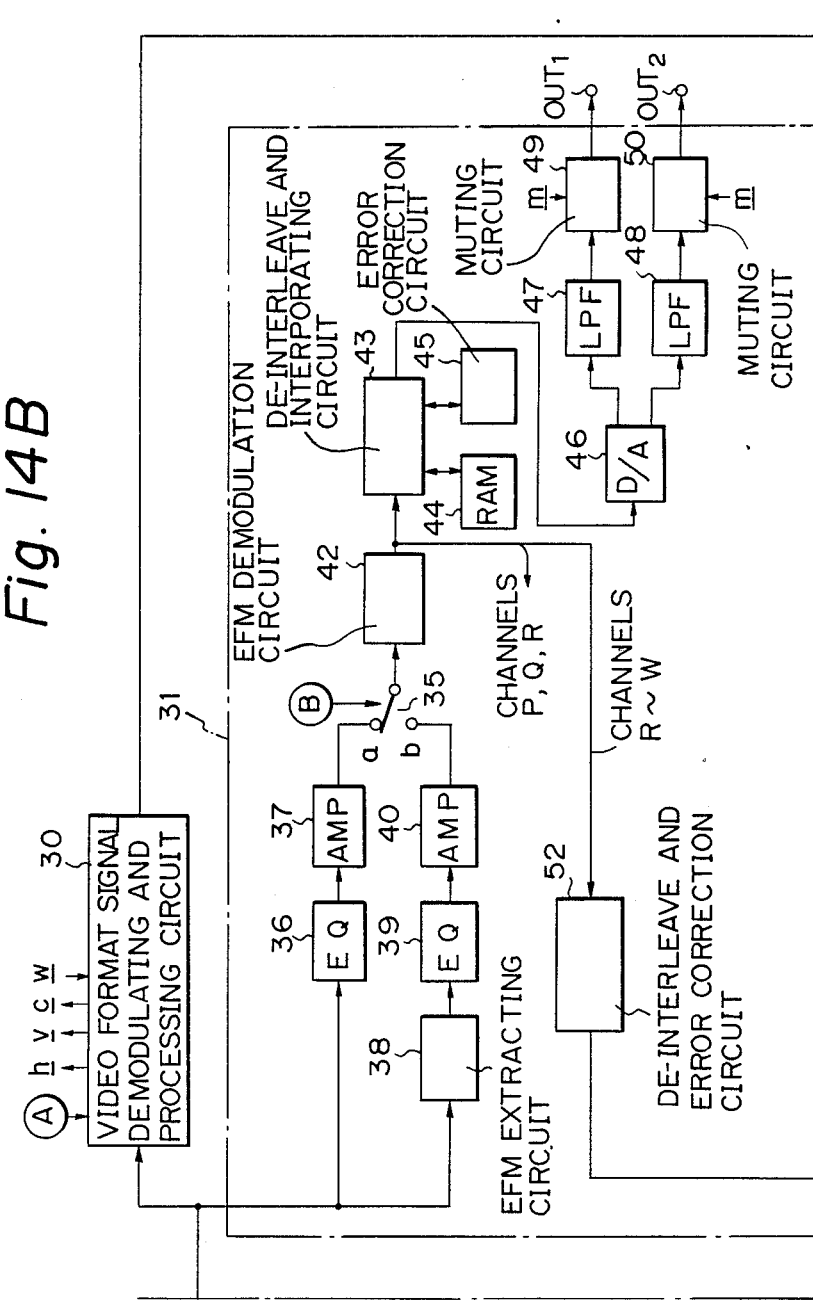

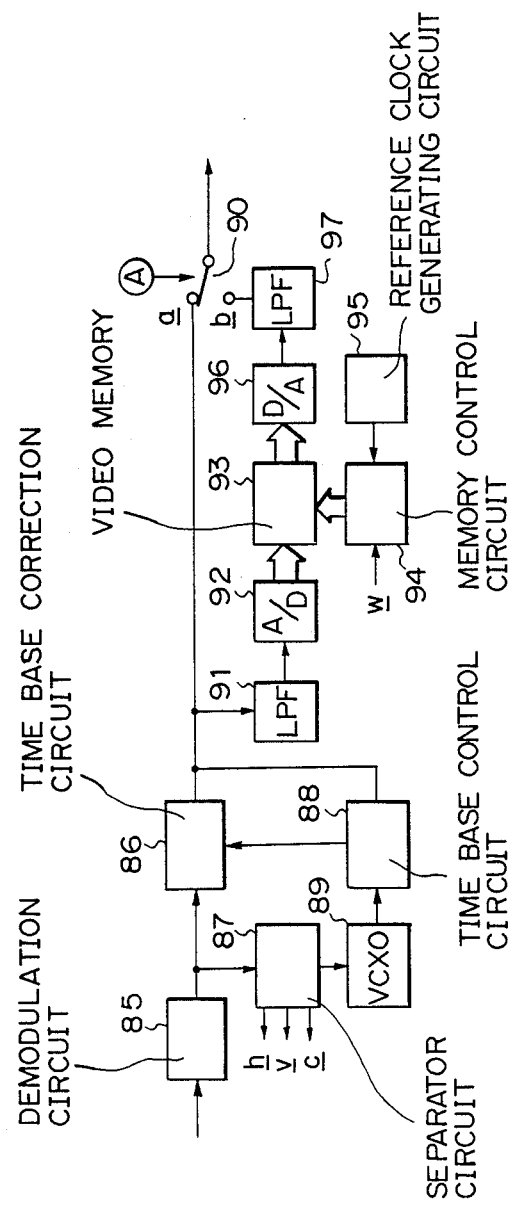

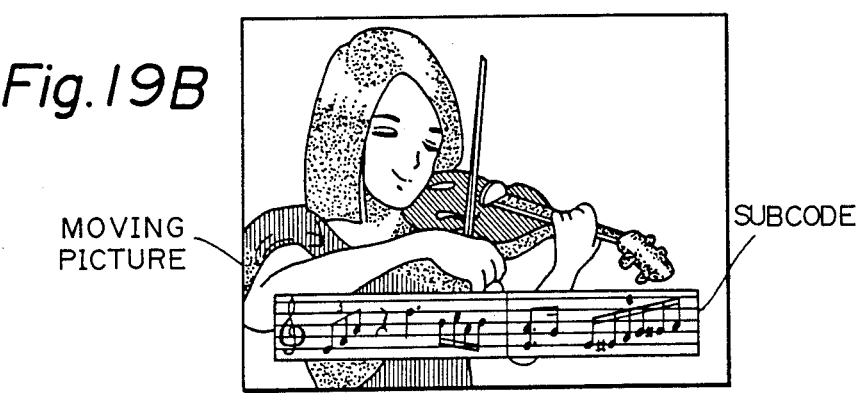
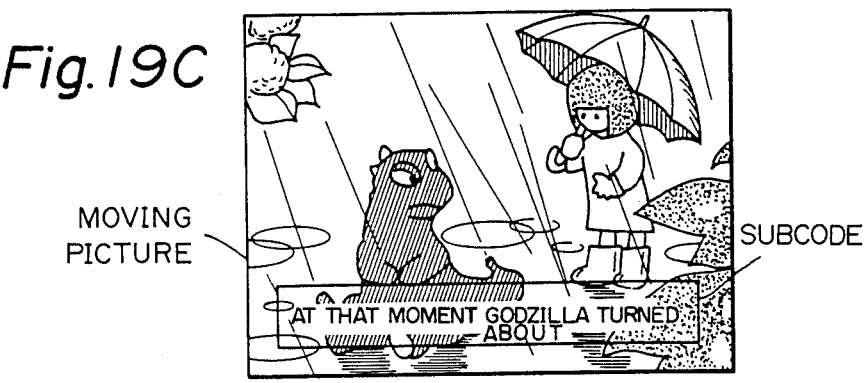

| # 1 | # 2 | # 3 |
|-----|-----|-----|
| # 4 | # 5 | # 6 |
| # 7 | # 8 | # 9 |

METHOD OF RECORDING AND REPRODUCING PICTURE INFORMATION, RECORDING MEDIUM, AND RECORDING MEDIUM PLAYING APPARATUS

BACKGROUND OF THE INVENTION

1. Field of the Invention

The present invention relates to a method of recording and reproducing picture information on and from a recording medium such as a video disc, a digital audio disc, and so on, and a recording medium, and also relates to a recording medium playing apparatus.

2. Description of Background Information

Systems are proposed in which picture information is recorded and reproduced in the form of the subcode on and from a digital audio disc having the diameter of 12 centimeters, generally referred to as the compact disc (abbreviated as the CD hereinafter). The subcode is made up of eight subcode bits, and bit groups forming the subcode are divided into eight channels denoted respectively by letters P, Q, R, S, T, U, V, and W. In the method in which the picture information is recorded and reproduced in the form of subcode, data corresponding to picture information is configured such that a symbol is formed by 6 bits of channels R through W out of the 8 bits forming the subcode, and 98 symbols are treated as one block, as illustrated in FIG. 1. Two symbols in the 98 symbols are used as a sync signal, and 24 symbols obtained by dividing the remaining 96 symbols, by four are treated as a minimum unit of data, i.e. a "pack", which constitutes one instruction of picture processing.

More specifically, the first symbol (referred to as symbol 0 hereinafter) of the 24 symbols shows one of several modes. A symbol 1 following this symbol 0 forms instruction which indicates the sort of the instruction. Symbols 2 and 3 following the symbol 1 constitute a parity Q which is an error correction code. Symbols 4 through 19 following the parity Q constitute a data field, and include information such as color information. Finally, symbols 20 through 23 following the data field constitute a parity P which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, the original image is to be maintained, and all data in the "pack" are 0 for this mode.

The "line-graphics mode" is provided for such a case that a liquid crystal display is provided on the front face of the player, to display notes such as an explanation of a music selection. As shown in FIG. 2, a picture area being long sideways is formed by pixels which are arranged in 288 columns and 24 rows. In other words, each row includes 288 pixels and each column includes 24 pixels. The term "pixel" stands for the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, a line of "fonts" is added to the upper and lower outer peripheries and the right and left peripheries of the Screen area, to form a picture area having 50 "fonts" in the direction of row, and 4 "fonts" in the direction of column. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

As instructions for the picture processing, there are an instruction for painting out the whole picture area by one certain color, an instruction for drawing a picture in one "font" on the screen by using two different colors, an instruction for moving the whole picture upward or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P form data including information relating to a pause between two musical numbers.

In systems of recording and reproducing picture information as the subcode explained above, it is general that the subcode obtained at the time of playing of a disc is simply decoded in order. In such a case, even if picture data indicating the title of the disc, or the title of the musical number (or the musical composition) is prepared as the subcode, it is not possible to selectively display such a data. Thus there has been a problem that the effective use of the subcode data is not attained.

OBJECT AND SUMMARY OF THE INVENTION

The present invention is based on the point described above, and an object of the present invention is to provide a system for recording and reproducing picture information by which a selective display of picture information recorded as the subcode is performed.

A system for recording and reproducing picture information according to the present invention is characterized by the steps of recording on a recording medium, at the time of recording graphic codes including picture information on the recording medium as the subcode of a coded information, identification information indicative of the position of an area of the recording medium in which a predetermined section of the subcode is recorded, and at the time of playing of the recording medium, searching that area in response to a command by using the identification information, and generating a picture signal corresponding to a graphic code as the subcode obtained by reading information recorded in that area.

BRIEF DESCRIPTION OF THE DRAWINGS

FIG. 1 is a diagram showing the recording format of subcode data;

FIG. 2 is a diagram showing the structure of picture in the "line-graphics mode";

FIG. 4 is a diagram showing a recording format of a system according to the present invention;

FIG. 5 is a diagram showing the format of a channel R of the subcode to be recorded in a lead-in area;

FIG. 6 is a diagram showing the format of a data field;

FIG. 7 is a diagram showing the sort of recording modes in the method according to the present invention;

FIG. 8 is a diagram showing the construction of "load transparency control table";

FIG. 9 is a diagram showing the correspondency between the bit pattern of TCB and the mixing ratio;

FIG. 10 is a diagram showing "load color look-up table color 0 through color 7" instruction;

FIG. 11 is a diagram showing the construction of "write font foreground/background" instruction;

FIGS. 14A through 14C, when combined, are a block diagram showing an apparatus for reproducing picture information recorded on a disc in accordance with recording and playback method according to the present invention;

FIG. 14 is a diagram showing the arrangement of FIGS. 14A through 14C;

FIG. 15 is a block diagram showing a specific configuration of video format signal processing circuit 30 in the apparatus shown in FIGS. 11A through 11C;

FIG. 17 is a diagram showing the arrangement of FIGS. 17A and 17B;

FIGS. 18 and 19A through 19C are diagrams showing pictures obtained by the apparatus shown in FIGS. 14A through 14C;

DETAILED DESCRIPTION OF PREFERRED EMBODIMENTS

An embodiment of the method according to the present invention will be explained with reference to FIGS. 4 through 21 of the accompanying drawings.

As shown in FIG. 4, TOC (Table of Contents) data is recorded in a lead-in area of a CD, and digital audio data corresponding to musical numbers (or musical compositions) of TNO (the number of music) 1 through N is recorded in the program area, and other predetermined data is recorded in a lead-out area of the CD.

In a portion having a duration of several seconds through several tens of seconds of the recording area in which the data corresponding to each musical number is recorded, a music title data #1 (through #N) which is a data corresponding to a group of letters indicating the title of the musical number is recorded being inserted as the subcode, and a label (for example, indicating "music number i, data number 1") is allotted thereto.

In the lead-in area, the label "music number i, data number 1", and a data indicating the recording position of the recording area to which the label is allotted, are recorded. More specifically, as illustrated in FIG. 5, the format of bits in the channel R, for example, of the subcode to be recorded in the lead-in area is the same as the format of bits in the channel Q, and the number of bits in the channel R of one subcode frame is 98, as in the case of other channels. Among 98 bits, 96 bits excluding two bits forming the sync signal are divided into four fields, that is, "control field", "address field", "data field" and "CRCC field".

The bits in the data field are, as illustrated in FIG. 6, used to form codes indicating address data $A_1, A_2, \ldots A_N$ and $B_1, B_2, \ldots B_N$ of the start and end position of the recording areas to which labels "music number 1, data number 1", "music number 2, data number 1", ... "music number N, data number 1" are allotted respectively.

Figure 13:
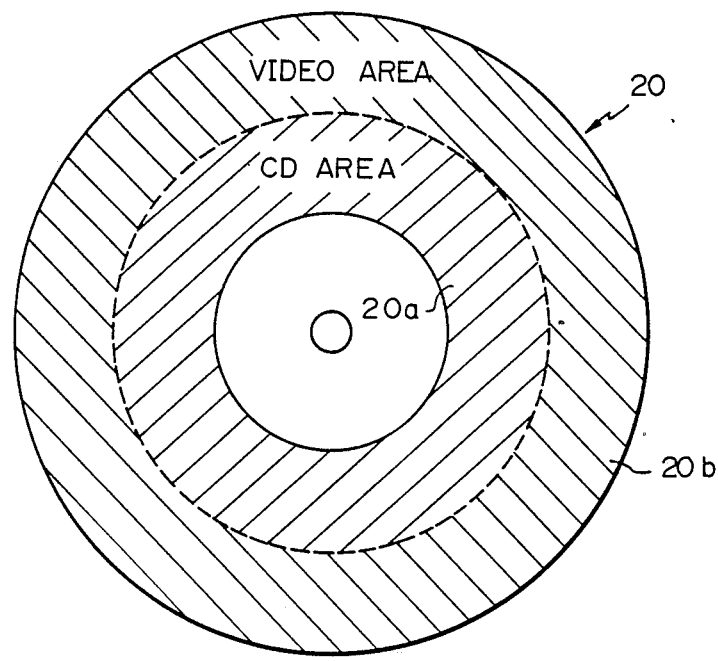
FIG. 13 is a diagram showing recording area of a composite disc.
Figure 14C:
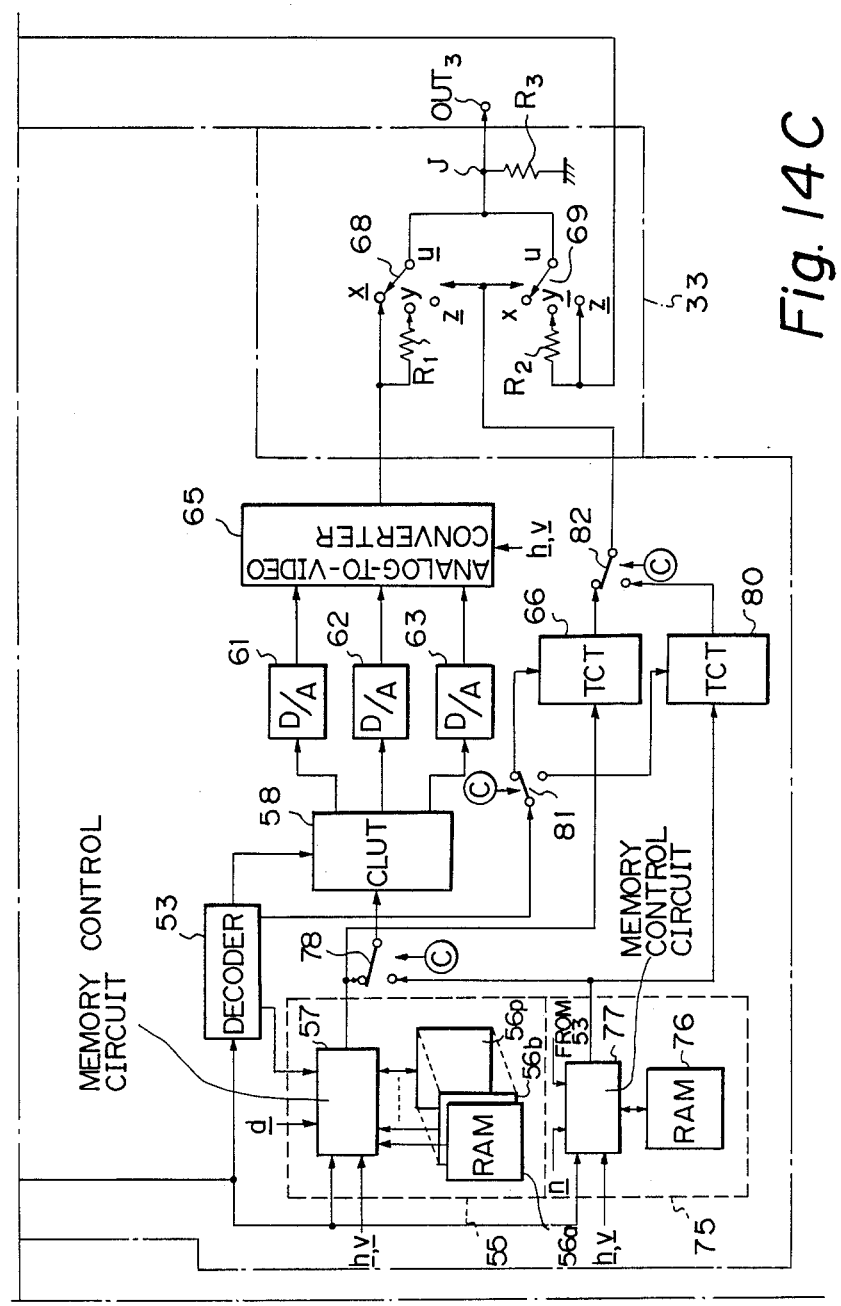

On the other hand, in order to perform the recording on a composite disc as shown in FIG. 13, a code to be inserted as the symbol 0 is set in order to designate an additional mode shown in FIG. 7, that is, "graphic mode with motion picture" according to a recording and reproducing system which is separately proposed by the applicant of the present application and others, in addition to the "zero mode" the "line-graphics mode", the "TV-graphics mode" and the "user's mode" which are also used in conventional methods.

The structure of picture in the "graphics mode with motion picture" is identical with that in the "TV-graphics mode", and an instruction designated as "load transparency control table" having a structure shown in FIG. 8 is provided. This "load transparency control table" instruction is an instruction for designating the mode for each pixel in picture area. Three modes are designated by this instruction, and those are namely, "transparent mode", "mixing mode", and "non-transparent mode". In these three modes, different values are selected for the mixing ratio between a video format signal obtained by the subcode and a video format signal which is recorded by multiplexing together with the coded information signal including the subcode.

The bits in the channels R through W of each of the symbols 4 through 8 and the channels R and S of the symbol 9 constitute a series of codes TCB-0 through TCB 15 which respectively designate one of modes which will be described later for each of the group of pixels to which one of colors, which are registered as color number "0" through color number "15", is allotted. FIG. 9 shows a relationship between bit patterns of the codes TCB-0 through TCB-15 and the modes designating the mixing ratio, and the mixing ratio in each mode.

In addition, the sixteen colors indicated by the color number "0" through "15" are set by a "load CLUT color 0 through color 15 (load color look-up table color 0 through color 15)" instruction. The "load CLUT color 0 through color 15" instruction is an instruction having a structure illustrated in FIG. 10, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With this circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "31". The mixing of colors for each of the color number is as follows. Red color is represented by four bits of the channels R through U of even symbols allotted to the color number. Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4$ (=16) sorts of gray scales are available for each color, and preparation of $16^3$ (=4096) colors is possible since three colors (RGB) are used. In addition, a gray scale "0000" corresponds to the darkest state, and a gray scale "1111" corresponds to the brightest state.

On the other hand, a "write font foreground/background" instruction is used in the "TV-graphics mode", which has such a structure as illustrated in FIG. 11. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, sub-picture channels can be designated by using four bits of the channels R and S of the symbols 4 and 5. By this feature, as many as sixteen picture channels can be designated. Sixteen sorts of picture are previously recorded on a disc for example, and on the playing side, a desired picture channel can be selected at the time of playing by this scheme of designating the picture channel.

Figure 3:
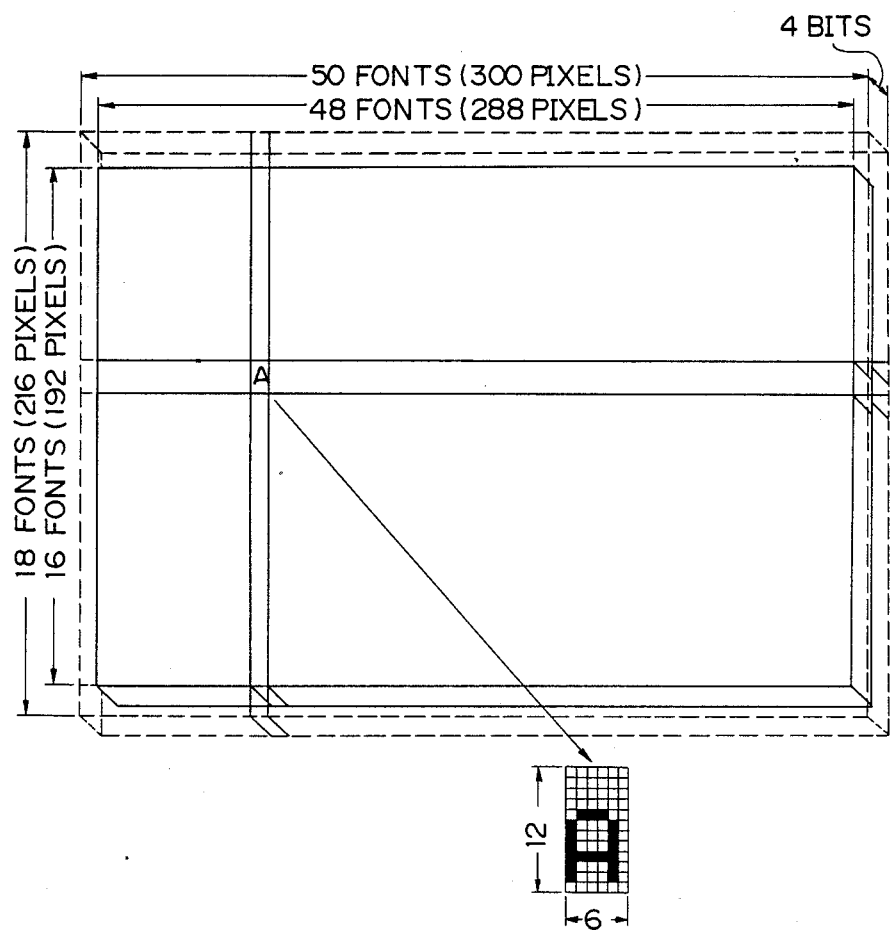
FIG. 3 is a diagram showing the structure of picture in the "TV-graphics mode"
Figure 12:
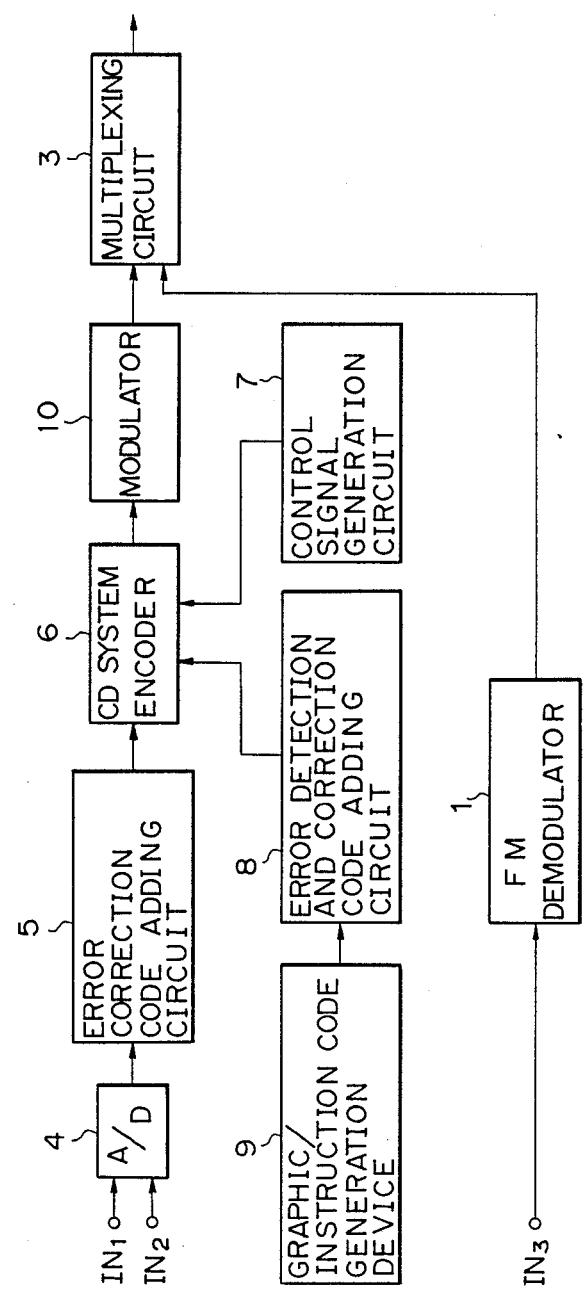
FIG. 12 is a block diagram showing an example of the construction of recording apparatus.

FIG. 12 shows an apparatus for recording the above explained codes on a recording disc by inserting the codes in the subcode of a coded information signal.

In the arrangement shown in FIG. 12, two-channel audio signals and a video format signal outputted from a video tape recorder for example, are respectively supplied to input terminals $IN_1$, $IN_2$, and $IN_3$. The video format signal is supplied to an FM modulator 1. In the FM modulator 1, a carrier signal of a predetermined frequency is FM-modulated by the video format signal. An FM signal outputted by this FM modulator 1 is supplied to a multiplexing circuit 3. On the other hand, left and right-channel audio signals are supplied to an analog-to-digital converting circuit 4. The analog-to-digital converting circuit 4 is configured to perform the sampling of each of the left and right-channel audio signals at a sampling frequency of 44.1 MHz for example, to generate two digital data corresponding to two sampled values obtained by the sampling, and to output the digital data after treating them by time division multiplexing. The output data of this A/D converter 4 is supplied to a CD system encoder 6 through an error correction code adding circuit 5 which performs the interleave of the data, the error detection, and addition of codes for the error correction. To the CD system encoder 7, an output signal of the control signal generating circuit 7 and an output signal of the error detection and correction code adding circuit 8 are supplied. The control signal generating circuit 7 is configured to generate data such as a data indicating the time elapsed after the start of the supply of audio signals to the input terminals $IN_2$ and $IN_3$, and a data indicating a pause between music selections or a portion within one music selection of the audio signals.

On the other hand, output data of the graphic/instruction code generation device 9 is supplied to the error correction and correction code adding circuit 8. The graphic/instruction code generation device is configured to record a plurality of codes which are previously inputted by key operations for example, and to read-out and output desired codes. The error detection and correction code adding circuit 8 is configured to perform the interleave and error detection of the output data of the graphic/instruction code generation device 9 and the addition of the correction code.

The CD system encoder 6 is configured to form a recording signal by making the output of the control signal generation circuit 7 data of the channels Q and P, and making the output of the graphic code generating device through the error detection and correction code adding circuit 8 data of the channels R through W, and inserting those data into the digital data from the A/D converter 4. Output signal of this CD system encoder 6 is supplied to a modulator 10 and converted to an EFM (Eight to Fourteen Modulation) modulation signal. The output signal of this modulator 10 is supplied to the multiplexing circuit 3, and processed by a frequency multiplexing with the FM-modulated video format signal.

The output signal of the multiplexing circuit is supplied to an optical disc recorder of known arrangement (not shown) in which the strength of a light beam irradiated on the recording surface of a disc rotated at a constant linear velocity for example, is modulated by this signal. As a result, the graphic codes including picture information and the instruction codes are recorded on the recording disc as the subcode of the digital audio signal, in addition to the video format signal and the digital audio signal as the coded information signal.

FIG. 13 shows a composite disc 20 carrying a digital audio signal functioning as the coded information signal into which the subcode including picture information is inserted as explained above. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including picture information being inserted, wherein the superimposition is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, in the playing time, to reproduce the signal by rotating the disc at the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups formed correspondingly to each area by the repetition of index codes which respectively indicate start and end times of small portions which together constitute each area. In addition, the index codes of the audio lead-in area include information showing whether the disc itself is a composite disc or a disc of other type.

The format of the bits of the channel R in the subcode recorded in the audio lead-in area is, as shown in FIG. 5, the same as the format of the bits of the channel Q. Those bits of the data field of the channel R are arranged as illustrated in FIG. 6.

FIGS. 11A through 11C show a disc player for playing a composite disc which has been explained above. As illustrated in these figures, a disc 20 is rotated by a spindle motor 21, and information recorded thereon is read-out by means of a pickup 22. The pickup 22 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is movable in the direction of disc radius by a direct drive of a transmission mechanism 25 which in turn has a slider motor 24 as a source of driving force, and made by a combination of rack and pinion gears. A read-out RF (radio frequency) signal outputted by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and configured to selectively output one of the video format signal outputted by the demodulation circuit and the video format signal read-out from the memory in accordance with a changeover command from a system controller 32. The video format signal outputted by the video format signal demodulating and processing circuit 30 is supplied to a video switch 33. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is provided with a selector switch 35 which changes its switch position in accordance with the area to be played (the CD area or the video area) during the playing of a composite disc. The selector switch 35 is operated to a position a during the playing of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as the EFM signal obtained during CD area playback.

During playback of a CD disc, the selector switch 35 is held in position a.

The playback EFM signal selected by the selector switch 35 is supplied to an EFM demodulation circuit 42 which performs the demodulation process, to obtain a PCM data that is digital data including audio information of left and right channels which is for example time-division multiplexed, and the subcode. The digital data including audio information outputted by this EFM demodulation circuit 42 is supplied to a de-interleave and interpolating circuit 43. The de-interleave and interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is outputted. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals $OUT_1$ and $OUT_2$ through muting circuits 49 and 50. The muting circuits 49 and 50 are configured to perform the muting operation for the audio output in response to a muting command m outputted from the system controller 32.

On the other hand, in the subcode outputted by the EFM demodulating circuit 42, the bit of the channel R is supplied to the system controller 32 and a de-interleave and error correction circuit 52. Also, two bits of the channels P and Q are supplied only to the system controller 32, and six bits of the channels R through W are supplied only to the de-interleave and error correction circuit 52 in which the de-interleave of the six bits of the channels R through W and the error correction using the parity Q and P are performed. Output data of the de-interleave and error correction circuit 52 is supplied to a mode/instruction decoder 53. The mode/instruction decoder 53 is configured to decode the mode represented by the three bits of the channels R through T of the symbol 0 of each pack, the mode designated by the item represented by the three bits of the channels U through W of the symbol 0 of each pack, and the instruction represented by the six bits of the channels R through W of the symbol 1 of each pack, and to supply to each part signals respectively indicative of the modes and the instruction.

Furthermore, the output data of the de-interleave and error correction circuit 52 is supplied to a picture memory devices 55 and 75. The picture memory device 55 includes sixteen RAMs 56a through 56p having addresses respectively corresponding to all pixels on a picture having 50 "fonts" by 18 "fonts" in the row and column directions, and four bits of data can be stored in each address, and a memory control circuit 57 for sensing data indicating the color number of each pixel of each picture channels in the output data of the de-interleave and error correction circuit 52 by using the kind of the modes and the instruction indicated by the output of the mode/instruction decoder 53 and writing them in the corresponding addresses of the RAMs 56a through 56p, and for reading out sequentially in a predetermined order one memory content of the RAMs 56a through 56p corresponding to the picture channel designated by a data d by the key operation in an operation part 60 in accordance with horizontal and vertical sync signals h and v. The picture memory device 75 includes a RAM 76 having the same structure as the RAMs 56a through 56p, and a memory control circuit 77 for dividing the memory area of the RAM 76 in accordance with a command from the system controller 32, sensing data indicating the color number of each pixel of each picture channels in the output data of the de-interleave and error conrrection circuit 52 by using the output of the mode/instruction decoder 53 and writing them in an area of the RAM 76 designated by a command from the system controller 32, and for reading out sequentially in a predetermined order one memory content of the RAM 76 in accordance with horizontal and vertical sync signals h and v.

The data outputted by the picture memory devices 55 and 75 are supplied to a changeover switch 78. The changeover switch 78 is configured to selectively output the output data of the picture memory device 55 when a changeover command is not supplied from the system controller 32, and selectively output the output data of the picture memory device 75 when the changeover command is supplied. The output data of this changeover switch 78 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordance with the kind of the modes and the instruction indicated by the output signal of the mode/instruction decoder 53, and hold the color data corresponding to each color number, and configured to select and output color data of the color number designated by the data read-out from the picture memory 55.

The output data of this CLUT 58 is made up of three data respectively representing the level of one of the R, G, B color signals by using four bits. The three data outputted by the CLUT 58 and indicating the levels of the R, G, B color signals are supplied to D/A converting circuits 61, 62, and 63, and are converted to analog signal. Ouput signals of these D/A converting circuits 61 through 63 are supplied to an analog-to-video converting circuit 65. The analog-to-video converting circuit 65 is configured, for example, to form a video signal of the NTSC system by the steps of obtaining a luminance signal and two color difference signals by the output signals of the D/A converting circuits 61 through 63, generating a color carrier signal by adding signals obtained by the parallel modulation of two color subcarrier signal having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and sent subsequently.

In addition, the output data of the de-interleave and the error correction circuit 52 are also supplied to a transparency control tables 66 and 80 (these tables being referred to hereinafter as the TCT). The TCTs 66 and 80 are based on a recording and reproducing system which is separately proposed by the applicants of the present application and others, and are configured to detect a "load TCT" instruction in the output data of the de-interleave and error correction circuit 52 in accordance with the kind of the modes and instruction indicated by the output signal of the mode/instruction decoder 53, hold transparency control bits TCB-0 through TCB-15, and output by selecting one of the TCB-0 through TCB-15 being held, corresponding to a color number indicated by the data read-out from the picture memory devices 55 and 75. To the TCTs 66 and 80, the output signal of the mode/instruction decoder 53 is supplied through a changeover switch 81. The changeover switch 81 is configured to selectively supply the output signal of the mode/instruction decoder 53 to the TCT 66 when the changeover command is not supplied from the system controller, and to selectively supply the output signal of the mode/instruction decoder 53 to the TCT 80 when the changeover command is supplied.

The output signals of the TCTs 66 and 80 are supplied to a video switch 33 as control signals through a changeover switch 82. The changeover switch 82 is configured to selectively output the output signal of the TCT 66 when the changeover command is not supplied from the system controller, and to selectively output the output signal of the TCT 80 when the changeover command is not supplied. In addition to the output signals of the TCTs 66 and 80, the video format signal obtained from the subcode and outputted by the analog-to-video converting circuit 65, and the video format signal outputted by the video format signal demodulating and processing circuit 30 are supplied to the video switch 33.

In the video switch 33, the video format signal obtained from the subcode is supplied to a stationary contact x of the changeover switch 68, and also supplied to its stationary contact y through a resistor $R_1$. No connection is made to a stationary contat z of the changeover switch 68. The changeover switch 68 is configured to selectively output one of the signals supplied to its stationary contacts x, y, z by moving its movable contact u to be in contact with one of the stationary contacts x, y, z in accordance with a control signal issued from the TCT 66 or TCT 80. The video format signal outputted from the video format signal demodulating and processing circuit 30 is directly supplied to a stationary contact z of a changeover switch 69 and also supplied to its stationary contact y through a resistor $R_2$. No connection is made to a stationary contact x of the changeover switch 69. The changeover switch 69, like the changeover switch 68, is configured to move its movable contact u to be in contact whith one of its stationary contacts x, y, z in accordance with the control signal. The movable contacts u, u of the changeover switches 68 an 69 are mutually connected. A resistor $R_3$ is connected between a common junction J of the movable contacts u, u and ground. A mixed signal of the video format signal obtained from the subcode and the video format signal outputted from the video format signal demodulating and processing circuit 30 is derived at the common junction J. When the movable contact u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. When, on the other hand, the movable contacts z, z are in contact with the stationary contacts y, y, the mixing ratio is equal to M which is determined by the resistors $R_1 R_2$, and the resistance of the resitors $R_1$ and $R_2$ are selected so that M has a value between 20% and 80%. The signal derived at the common junction J is supplied to a video output terminal $OUT_3$.

A position detector 70 is provided in the vicinity of the path of the movement of pickup 22 along the radial direction of disc, and serves to detect when the beam spot emitted from the pickup 22 has reached a position corresponding to the vicinity of the boundary between the CD are end the video area of a composite disc, to produce a detection signal. By the generation of this detection signal, a state that the pickup 22 has reached to the video area can be detected. The position detector 70 can have a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the bits of the channels P, Q, R in the subcode outputted from the EFM demodulation circuit 42, disc designation information from the control part 60 indicating whether the disc to be played is a compact disc or a composite disc, and mode designation information from the operation part 60, indicating whether the reproducing area is only the CD area or the video area, or both CD and video areas in the case of the playback of a composite disc. In this system controller 32, the processor executes processing of the signals inputted in accordance with programs previously stored in the ROM, and performs the control operation of each part of the video format signal demodulating and processing circuit 30, the selector switch 35, the memory control circuits 57 and 77, a drive circuit (not shown) for driving the spindle motor 21, the driving circuit 71 for driving the slider motor, the display part 72, and the changeover switches 78, 81, and 82.

FIG. 15 is a block diagram showing a specific circuit construction of the video format signal demodulating and processing circuit 30. As shown, the RF signal from the RF amplifier 26 is demodulated at a demodulation circuit 85, then supplied to a time base correction circuit 86 and to a separator circuit 87. In the separator circuit 87, the horizontal sync signal h, the vertical sync signal v and the control data c which are contained in the video format signal are extracted. The time base correction circuit 86 consists of, for example, a variable delay element of e.g. CCD (charge coupled device) and configured to vary the delay amount of that element in accordance with a control signal from a time base control circuit 88. The time base control circuit 88 is configured to output as the control signal a signal corresponding to a phase difference between an oscillation signal and its divided signal of a crystal oscillator (VCO) 89 which oscillates, for example, in synchronism with the horizontal sync signal h extracted at the separator circuit 87, and the horizontal sync signal and the color burst signal of the video signal transmitted through the time base correction circuit 86. For more specific configuration, reference is directed for example Japanese patent application laid-open number P56-102182.

The video signal having been processed by the time base correction operation is used as one input of a selector switch 90, and also supplied to an A/D converter 92 through an LPF (Low Pass Filter) 91. In the A/D converter 92, the sampling of the video signal is performed at intervals of a predetermined period, and the thus obtained sampled values are in turn converted to digital data. The output data of the A/D converter 92 is supplied to a video memory 93 consisting of a RAM (random acces memory) and so on. A memory having a capacity for storing video information of at least one field long is used as the video memory 93. Address and mode controls of this video memory 83 are performed by a memory control circuit 94. The memory control circuit 94 is configured to perform control operations for sequentially read-out data written in each address of the vido memory 93 in accordance with a clock from a reference clock generating circuit 95, and for rewriting the contents of each address of the video memory 93 in repsonse to a write enable signal w which is outputted from the system controller 32. The data read-out from the video memory 93 is converted to analog signal in a D/A (digital to analog) converter 96, and supplied through an LPF 97 as the other input to the selector switch 90. The selector switch 90 is normally held at a position a to selectively output the video format signal directly supplied from the time base correction circuit 86, and switched to a position b in response to a change-over command from the system controller 32, to selectively output the video format signal having been processed through the video memory 93.

Figure 16:
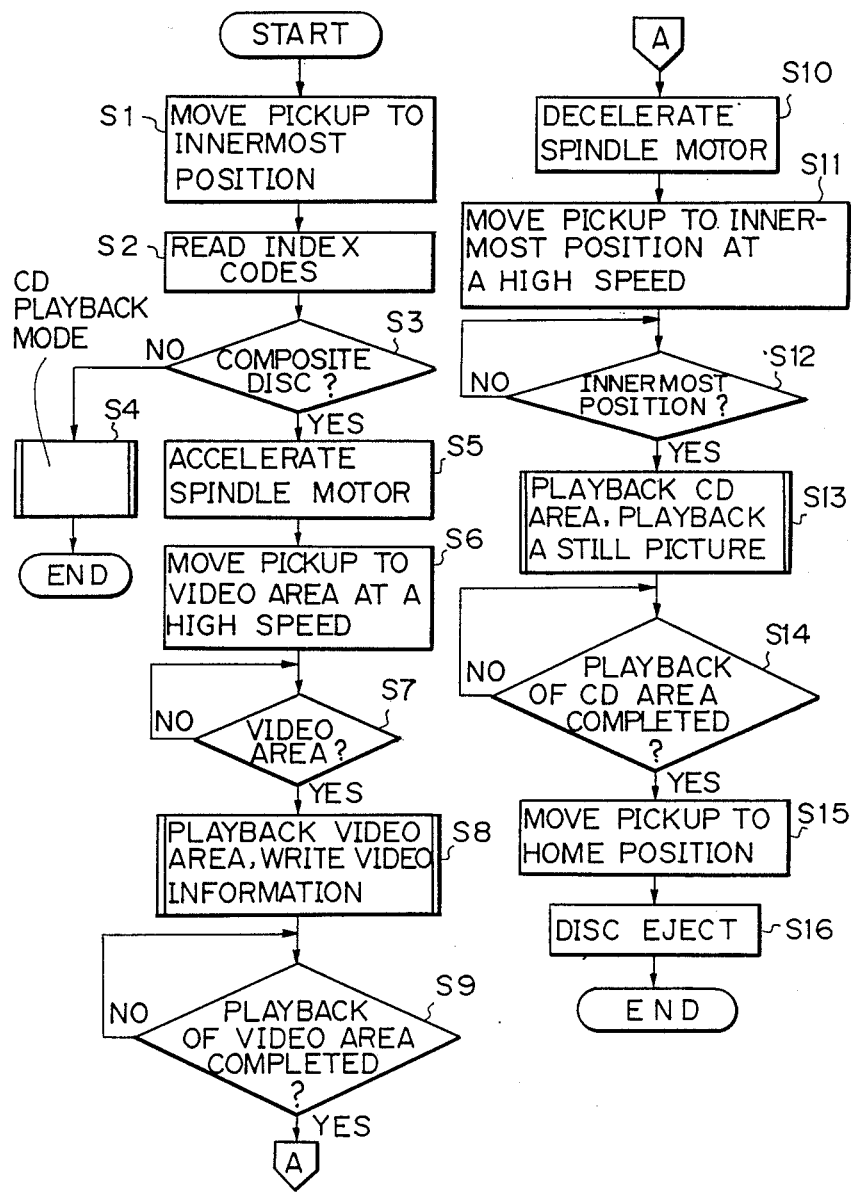
FIGS. 16, 17A and 17B are flowcharts showing the operation of processor in system controller 32 of the apparatus shown in FIGS. 14A through 14C.
Figure 17A:
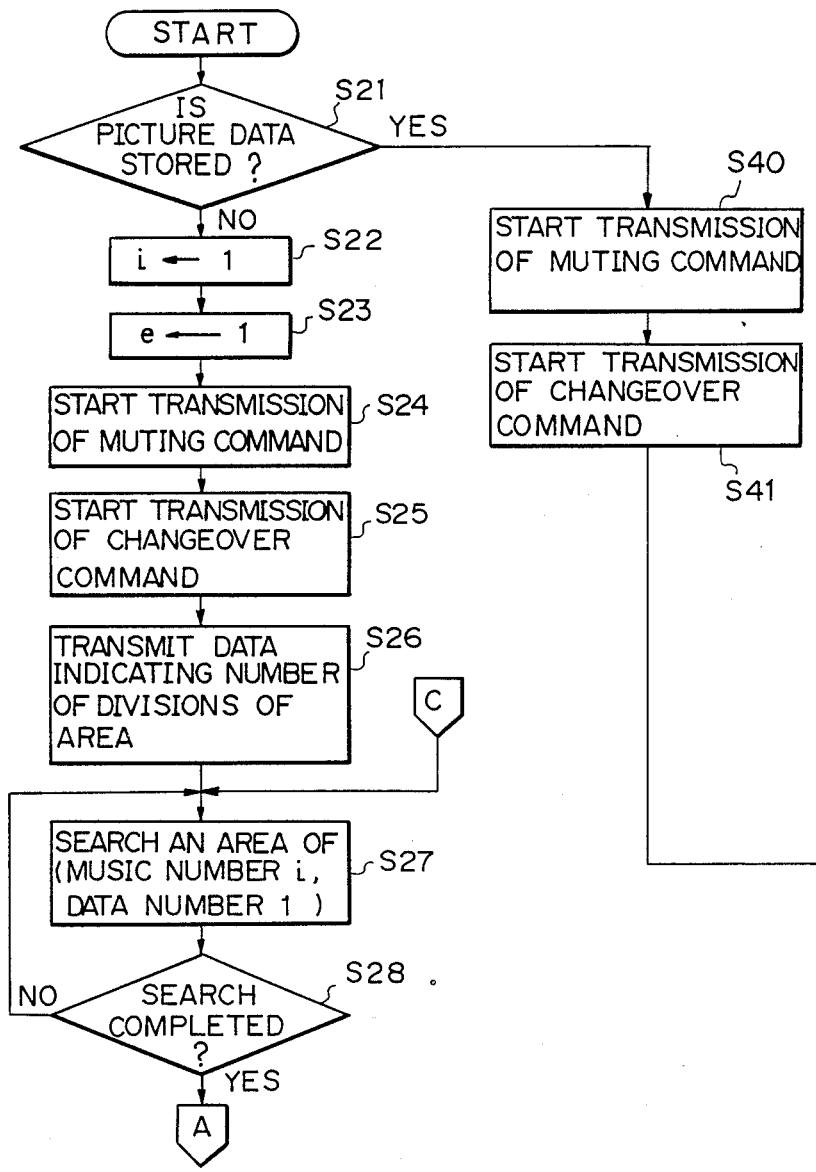
Figure 17B:
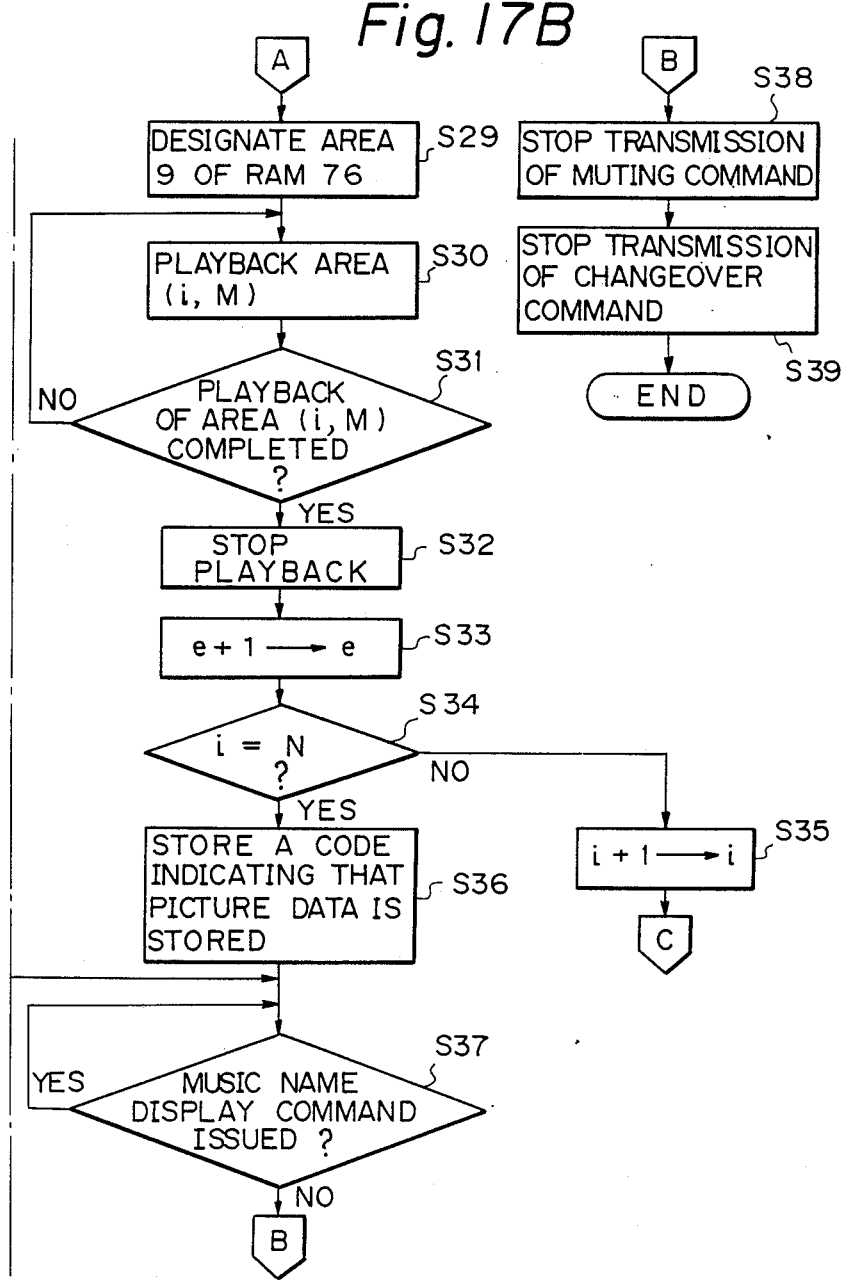

Operations of the processor in the system controller 32 in the above configuration will be specifically explained with reference to the flowcharts of FIGS. 16, 17A and 17B.

Assume that a composite disc is set in a playback position. When a start command is issued in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and performs the read-in of index code information which is recorded in an audio lead-in area at an innermost peripheral area of the disc (step S2). Subsequently, the processor judges whether or not the disc being set is a composite disc or not, on the basis the value of a predetermined bit of, for example, a control signal part in the data block constituted by the Q-channel bits forming the subcode, in the read information (step S3). If it is judged that the disc being set is a compact disc, then the execution directly proceeds to a CD playback mode (step S4) and a playback operation is continuously performed unless any command for the programmed music selecting operation, for example, has been issued. Since the playback operation in the CD playback mode itself is well know, the explanation thereof is omitted here.

If it is judged in the step S3 that the disc being set is a composite disc, the processor immediately accelerates the slider motor 21 to a maximum rated speed of rotation for the video area (step S5). At the same time, the processor moves the pickup 22 toward the outer periphery of disc at a high speed by driving the slider motor 24 at a high speed (step S6). After these operations, when it is detected that the pickup 22 has reached to the video area by the detection signal from the position detector 70 (step S7), the processor starts the blayback operation of the video area (step S8). During video area playback, the processor performs the control operation for writing the video information of at least one field (or one frame) long obtained from the disc in the video memory 93. This video information to be written may be, for example, first information in the video area, or designated by an address designation through the key operation of the operation part 60.

It it is detected that the playback of the video area has been completed, in step S9, then the processor decelerates the spindle motor 21 to the maximum rated speed of rotation for the CD area (step S10). At the same time, the processor drives the slider motor 24 at a high speed, to move the pickup 22 to the innermost peripheral position of the disc at a high speed (step S11). If it is detected (step S12) that the pickup 22 has reached the innermost peripheral position by the detection output signal of the above mentioned detector switch (not illustrated), the processor starts playback operation of the CD area (step S13). Concurrently to this, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback. When the completion of the CD area playback is detected by reading the information of audio lead-out (step S14), the processor initiate the driving of the slider motor 24 to move the pickup 22 to its home position (step S15) unless any operational command is present. Furthermore, a loading mechanism (not shown in the drawings) performs disc ejection (step S16), to complete the playback operating sequence.

When a music name display command is issued by a key operation in the operation part 60 during the execution of the main routine, the processor judges whether or not the picture data indicating the name of musical number is already stored, by the code for specifying the disc and a code indicating the completion of the writing operation (step S21). If it is judged, in step S21, that the picture data is not stored, the processor sets a value 1, as an initial value, in predetermined addresses of the RAM 76 for temporarily storing data indicating the music number i and an area e of the RAM 76 in the picture memory device 75 respectively (steps S22 and S23). Subsequently, the processor starts the transmission of the muting command m to the muting circuits 49 and 50, and the changeover command to thee changeover switches 78, 81, 82 (steps S24, S25). Then, the processor detects the number N of the areas in which the picture data indicating the music name is recorded by using the TOC, and transmits a data indicating a dividing number corresponding to the detected number, to the memory control circuit 77.

Subsequently, the processor searches the recording area to which (music number i, data number 1) is allotted as the label (steps S27, S28), and transmits a data for designating the area e of the RAM 76 to the memory control circuit 77 after the completion of the searching (step S29). The, the processor starts the reading operation (step S30), and senses the reading position by means of the channel Q of the subcode. Then, the processor judges whether or not the sensed reading position is identical with the end position of the recording area to which (music number i, data number 1) is allotted as the label by the data recorded as the TOC (step S31). Only when it is judged that the reading position is identical with the end position, the processor terminates the reading operation (step S32) and adds a value 1 to e (step S33).

Subsequently, the processor judges whether or not the music number i is identical with N (step S34). If it is judged, in step S34, that the music number i is not identical with N, processor proceeds to the step S27 after adding the value 1 to i (step S35).

If it is judged, in step S34, that the music number i is identical with N, the processor writes the code specifying the disc and the code indicating that the picture data is stored, in predetermined addresses of the RAM (step S36), and repeatedly performs the judgement as to whether or not the music name display command is issued continuously (step S37). Only when it is judged that the music name display command is not issued, the processor stops the transmission of the muting command m and the changeover command (steps S38 and S39), and restarts the execution of the routine which was being executed immediately before the proceeding to step S21.

If it is judged, in step S21, that the picture data is stored, the processor starts the transmission of the muting command m and the changeover command (steps S40 and S41), and proceeds to step S37.

In the operating sequence described above, playback of the information recorded in the CD area of the composite disc is performed in steps S10 through S14 after the playback of information recorded in the video area in steps S1 through S9. When the "load CLUT color 0 through color 7" instruction and the "load CLUT color 8 through color 15" instructions are decoded by the mode/instruction decoder 53 during video area playback, data of designated 16 colors among 4096 colors are held in the CLUT 58.

Subsequently, by the decoding of the "write font foreground/background" instruction etc., picture data of 16 channels are in turn stored in the RAM 56a through 56p in the picture memory device 55. When one of the picture data of 16 channels is designated by data corresponding to the key operation in the operation part 60, picture data of the designated channel is sequentially outputted from the picture memory device 55, and in turn supplied to the CLUT 58. By this operation, color data of a color number indicated by the picture data is then outputted from the CLUT 58. A video format signal based on this color data is outputted from the analog video converting circuit 65, and supplied to the video switch 33.

Figure 18:
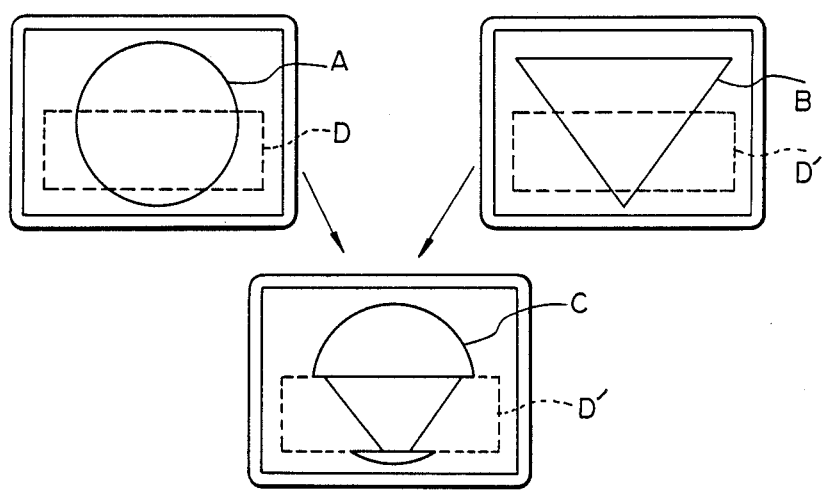

If the "load TCT" instruction, which is based on the recording and reproducing system separately proposed by the applicants of the present application and others, is decoded in this state, the transparency control bits TCB-0 through TCB-15 respectively corresponding to each color number are then held in the TCT 66. Among the TCB-0 through TCB-15 being held, one corresponding to the color number indicated by the data read-out from the picture memory device 55 is selectively outputted from the TCT 66, and the mixing ratio in the video switch 33 is designated by the output of the TCT 66. Thus, the mixing ratio between the video format signal outputted from the analog-to-video converting circuit 65 and the video format signal outputted from the video format signal demodulating and processing circuit 30 is controlled for each pixel. Consequenlty, a combination of picture such as illustrated in FIG. 18 is made possible. Specifically, the mixing ratio is set to 100% for a portion corresponding to each pixel outside a region D of a picture A base on the video format signal outputted from the video format signal demodulating and processing circuit 30, and set to 0% for a portion corresponding to each pixel within the region D. On the other hand, the mixing ratio is set to 0% for a portion corresponding to each pixel outside a region D' of a picture B based on the video format signal outputted from the analog-to-video converting circuit 65, and set to 100% for a portion corresponding to each pixel within the region D' of the picture B. Then a picture C can be formed by combining the portion of the picture A outside the region D and and the portion of the picture B within the region D'.

In this way, it is possible to compose a picture as illustrated in FIGS. 19A through 19C, in which a translation of a dialogue, a musical score, or an explanation of a scene, etc., obtained from the subcode is inserted into a moving picture obtained by the video format signal recorded in the video area or a still picture obtained by the video memory 83.

On the other hand, if the picture data is not stored in the RAM 76 when the music name display command is issued, the recording area of the RAM 76 is divided into nine areas if N=9 for example, and picture data recorded, as the subcode, in recording areas to which (music number 1, data number 1), (music number 2, data number 1), . . . (music number 9, data number 1) are allotted as labels respectively, are in turn stored by the operations of steps S21 through S35.

These data stored in the RAM 76 are in turn read-out by the memory control circuit 77 in a predetermined order, to form an output data of the picture memory device 75. The output data of the picture memory device 75 is supplied to the TCT 80 and also to the CLUT 58 through the changeover switch 78.

Figures 20, 21:
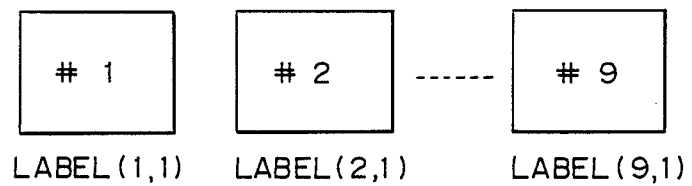
FIG. 20 is a diagram showing picture data indicating titles of music numbers.
FIG. 21 is a diagram showing an example in which pictures by picture data indicating nine titles of music numbers are displayed in a single picture area.

Therefore, by recording the "load TCT" instruction, by which the mixing ratio of the output signal of the analog-to-video converting circuit 65 becomes 100% for all areas of the two-dimensional picture, in each recording area to which each of (music number 1, data number 1) through (music number 9, data number 1) is allotted, nine pictures respectively indicating a name of a musical number or a musical composition as illustrated in FIG. 20 are displayed in a single two-dimensional picture as illustrated in FIG. 21.

In addition, the code specifying the disc and the code indicating that the picture data is stored are stored in predetermined addresses of the RAM of the system controller 32 by the operation of step S36. Therefore, by the contents of this RAM, the judgement as to whether or not the picture data is stored in the RAM 76 is performed at step S21, and the writing of data in the RAM 76 is not performed and the name of musical number is immediately displayed after the transmission of the muting command and the changeover command is started.

In the embodiment described above, the data number in the label is determined to be 1. However, the data number can be determined to be any value as far as the data number is a value corresponding to the position or the contents of the recording area to which the labels are allotted.

Furthermore, in the above embodiment, the order in which the name of musical number is displayed in the picture screen is determined to be identical with the order of recording. However, it is also conceivable to determine the order of displaying the name to be identical with the order of program playing, and the label allotted to each area can be utilized in such a case.

Moreover, it is not necessary that the address data Ai And Bi indicate an area in which a picture data corresponding to the whole picture area is recorded. For instance, the address data can be determined to indicate an area in which a picture data corresponding to a particular "font" in the picture area, and it is possible to compose a new picture by displaying the picture data obtained by the label at a desired position on the picture screen.

As explained in detail in the foregoing, the system of recording and reproducing picture information according to the present invention is configured such that, when graphic codes including picture information is recorded on a recording medium as being inserted as the subcode of a coded information signal, identification information indicating areas of the recording medium in which predetermined sections of the subcode are recorded is recorded on the recording medium. At the time of playing of the recording medium, those areas are searched in response to a command by using the identification information, and a picture signal corresponding to graphic codes as the subcode obtained by reading out information recorded in those areas is generated. Thus, picture data such as the title of the disc, the name of musical numbers, can be selectively displayed, and an effective use of the picture data is made possible.

What is claimed is:

1. A method of recording and reproducing picture information on a recording medium, comprising the steps of:

recording, in addition to a coded information signal, graphic codes including picture information on said recording medium by inserting said graphic codes in a subcode of said coded information signal, and recording on said recording medium identification information indicating positions of said recording medium in which predetermined sections of said subcode are recorded;

searching, at a time of playback of said recording medium, said positions in response to a picture information displaying command by using said identification information; and generating a picture signal corresponding to said graphic codes as the subcode obtained by reading information recorded in said positions.

2. A method as set forth in claim 1, wherein said identification information is recorded in a lead-in area of said recording medium.

3. A method as set forth in claim 1, further comprising a step for displaying a picture by said picture signal corresponding to said graphic codes in information recorded in said positions at a position in a display area determined according to a property of said coded information signal recorded in said positions.

4. An apparatus for playing a recording medium on which are recorded, in addition to a coded information signal, graphic codes including picture information being inserted as a subcode of said coded information signal, and identification information indicating positions of said recording medium in which predetermined sections of said subcode are recorded, said apparatus comprising:

a pickup means for reading signals recorded on said recording medium and generating a pickup output signal;

a coded information signal demodulating means for demodulating said coded information signal from said pickup output signal;

a graphic codes demodulating means for demodulating said graphic codes from an output signal of said coded information signal demodulating means;

an identification information demodulating means for demodulating said identification information from said output signal of said coded information signal demodulating means;

searching means for searching said positions in response to a picture information displaying command by using said identification information; and a means for generating a picture signal corresponding to said graphic codes obtained by reading information recorded in said positions.

5. A picture information recording medium, on which are recorded, in addition to a coded information signal, graphic codes including picture information inserted as a subcode of said coded information signal and identification information indicating positions of said recording medium in which predetermined sections of said subcode are recorded.

* * * * *